June 24, 1930.   H. HIERS   1,766,074
AIRPLANE BRAKE
Filed July 5, 1928   2 Sheets-Sheet 1

INVENTOR
HARVEY HIERS
By Frank L. A. Graham
ATTORNEY

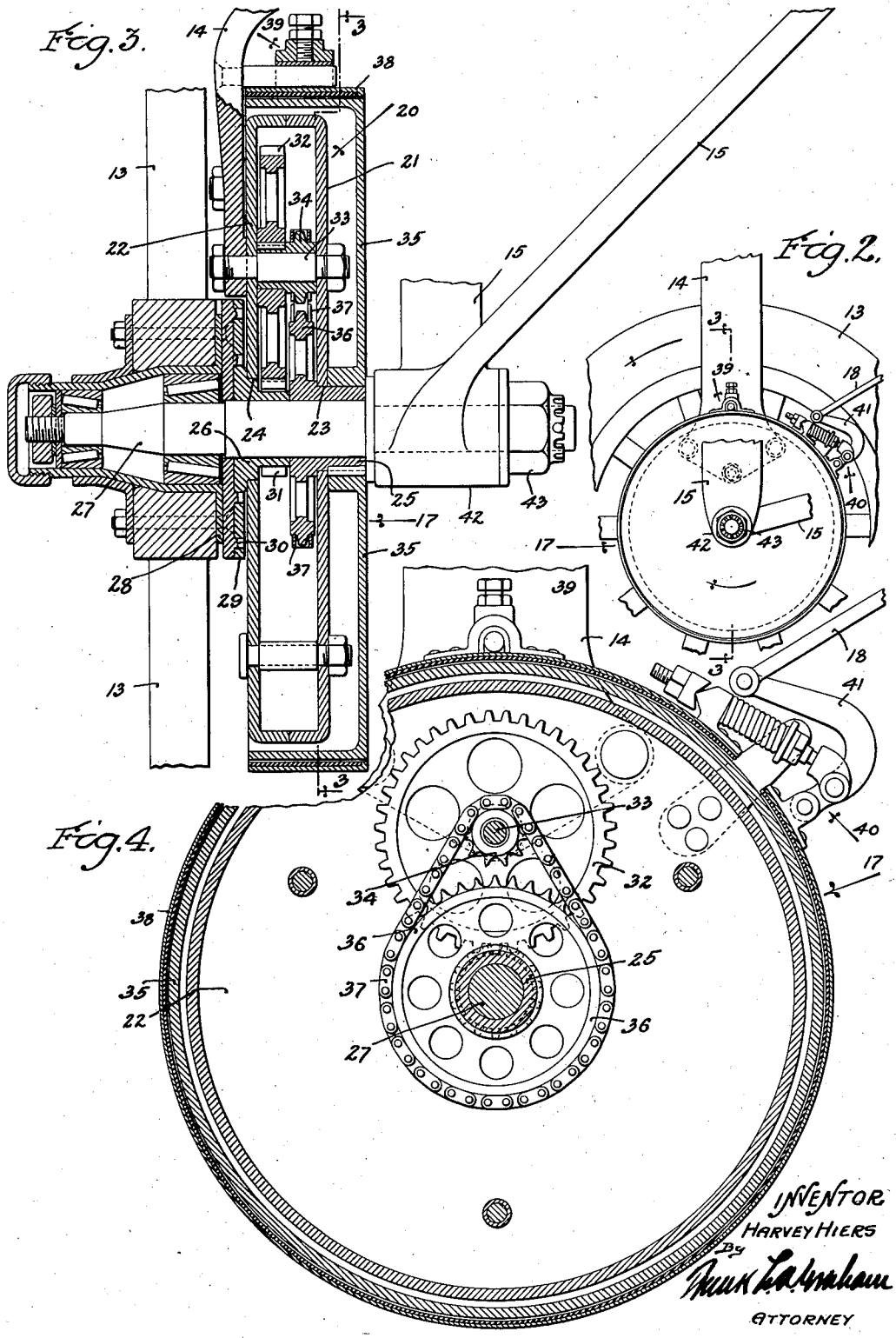

Patented June 24, 1930

1,766,074

UNITED STATES PATENT OFFICE

HARVEY HIERS, OF LOS ANGELES, CALIFORNIA

AIRPLANE BRAKE

Application filed July 5, 1928. Serial No. 290,313.

It is well known to those familiar with airplanes, that the weight of an airplane when it is resting upon the ground is carried at three points, the two ground wheels and the tail skid, and since most of the weight is distributed near the forward end of the fuselage, a comparatively small torque, applied about the ground wheels as an axis, is necessary to balance the plane upon the ground wheels or to tip it forward beyond the balance point.

In the ordinary type of brakes such as are used upon automobiles, the brake drums rotate in the same direction as the wheels and there is a forward torque transmitted to the brake band or shoe, the magnitude of which is dependent upon the forward speed of the wheel, and the weight which the wheel is supporting.

It therefore develops, that if an airplane, the wheels of which are equipped with ordinary brakes such as described above, is traveling over the ground at a high rate of speed, as in landing or taxying, the engagement of the brake shoes with the forward rotating drums, incurred in the application of the brakes, will result in a forward rotating torque, which in most cases is sufficient to throw the fuselage forward and out of balance, possibly breaking the propeller or completely overturning the plane.

Brakes of this nature have therefore, not come into very wide use, their presence generally proving to be more detrimental than beneficial, and various attempts have been made to develop a braking device for an airplane which could be effectively used, to stop the plane after it comes in contact with the ground, thereby greatly reducing the area necessary for landing purposes. Various hooks and third wheel brake constructions have been developed for use in connection with or in place of the tail skid, the great difficulty with such devices being that there is insufficient weight at the rear of the fuselage to make them effective.

Another disadvantage of braking devices of the third wheel or tail skid type is that they cannot be used in guiding the plane when it is being taxied upon the ground. It will be apparent that if one wheel of the ordinary airplane wheels, is held while a plane is being taxied or drawn over the ground by the propeller, the other wheel being free to rotate, the plane will tend to pivot about the wheel which is being held. This system adds greatly to the dexterity with which a plane may be guided since the method of using the rudder, as commonly used is at best rather awkward and inefficient.

It is therefore an object of this invention to develop a braking device, particularly adapted for use upon the ground wheels of an airplane in which the "braking torque" is opposed to the rotation of the wheels and the forward pull of the propeller, and in which the brake upon each wheel may be individually controlled for guiding the plane upon the ground.

These objects are accomplished by providing the brake drum with mechanism by means of which it is rotated in a direction opposite to the direction of the rotation of the wheel, and means whereby the braking action of the two wheels is separately controlled. If a drum engaging member such as a shoe or band is mounted upon a fuselage supporting strut, it will be apparent that the engagement between the shoe and the drum will result in a torque being applied to the fuselage which tends to increase the force with which the tail skid engages the ground. A device of this nature therefore develops three braking points upon a plane and eliminates all possibility of the plane being "nosed over" when the brakes are applied.

Another feature of this invention consists in providing a brake drum mounted upon a vehicle in a manner to impart a slower rotation to the drum than to the wheel of the vehicle. The purpose of this is to permit the engagement of the brake drum with the brake band at a slower rate of speed between the drum and the band than ordinarily occurs when the drum is driven directly at the same speed as the wheel. It is a well known fact that the engagement of a brake band with a brake drum, particularly in automobiles and airplanes traveling at a high rate of speed, requires experience and considerable skill to avoid a sudden and disastrous initial action of the brake. It is well established in mechanics that the frictional coefficient between bodies varies proportionally as the relative speed between the two bodies. It is to be recognized that brakes, and particularly automobile brakes and airplane brakes, require an initial soft or velvety action, and it is also well known that such action becomes impossible at high rates of speed. Consequently, it is an object of this invention to provide a brake drum that rotates at less speed than the ground wheel of the vehicle.

Further objects of this invention are the development of a brake of the class described which is compact and light in construction, and which may be easily installed and operated.

The objects and advantageous structural features of this invention will be better understood from the following description of the accompanying drawings, which are chosen for illustrative purposes only and in which:

Fig. 1 is an elevational view showing an airplane and the manner of applying the invention.

Fig. 2 may be considered as an enlarged elevation of the right wheel of the plane shown in Fig. 1.

Fig. 3 is a transverse elevational section of a preferred construction embodying the invention, and may be considered as having been taken through the wheel shown in Fig. 2 in a plane represented by the line 3—3 in Fig. 2.

Fig. 4 is an elevational section taken in a plane represented by the line 4—4 in Fig. 3.

Figure 1:
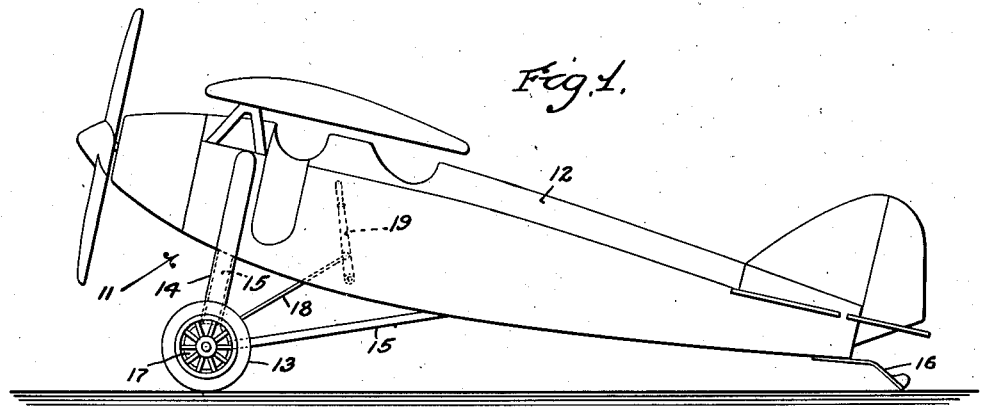

More particularly describing the invention as herein illustrated, reference numeral 11 indicates an airplane embodying a fuselage 12, ground wheels 13, ground wheel struts 14, bracing struts 15, and a tail skid 16.

The ground wheels are provided with brakes 17 which are applied by pull rods 18 controlled by hand levers 19. It will be understood that both brakes may, if desired, be controlled from a single lever, but as was mentioned above it is preferable to have them individually controlled for guiding purposes.

In the form of the invention illustrated in Figs. 2 to 4 inclusive, a housing 20 is illustrated as being mounted upon the lower end of the ground wheel supporting strut 14. Inner and outer faces 21 and 22 of the housing 20 are provided with bearing apertures 23 and 24, adapted to receive what may be termed a rearward rotating sleeve 25 and a forward rotating sleeve 26. These sleeves are rotatably mounted upon the shaft or axle 27 which supports the ground wheel 13.

The forward rotating sleeve 26 is outwardly attached to the ground wheel 13 by any suitable means such as the plates 28 and 29 upon the wheel and the sleeve respectively, the plates being held against relative rotation by means of the pin and recess construction indicated at 30.

The sleeve 26 is inwardly provided with a peripheral gear 31 which engages a secondary gear or "driving member" 32 rotatably supported in the housing 20 by means of a shaft 33. The shaft 33 also supports a pinion 34 which is illustrated as being keyed to the gear 32.

A brake drum 35 is mounted concentrically upon the rearward rotating sleeve 25 and is keyed or otherwise made rigid therewith. Means for imparting rearward rotation to the sleeve 25, is provided in the form of an inwardly formed or rigidly mounted sprocket or gear wheel 36 adapted to receive a sprocket chain 37 through which it receives rearward rotation from the pinion 34.

A drum engaging member comprising the brake band 38 adapted to engage the outer periphery of the drum 35 is illustrated as being mounted upon wheel supporting standard 14 by any suitable clamping means indicated at 39. The band is brought into engagement with the drum by any standard means such as the spring controlled lever organization illustrated at 40. Movement is transmitted to the band 38 through lever 41 by means of the pull rod 18.

The respective parts of the organization are illustrated as being held in position relative to the ground wheel 13 by means of a brace supporting sleeve or collar 42 which is retained upon the shaft 27 by means such as the lock nut 43.

The gears 31 and 32 and the pinions or sprocket gears 34 and 36, are preferably arranged in a ratio such that the speed of the drum 35 is greatly reduced relative to the speed of the wheel 13. This arrangement greatly increases the torque applying force and reduces the possibility of "grabbing" due to a sudden application of the brakes at high speed.

Figure 5:
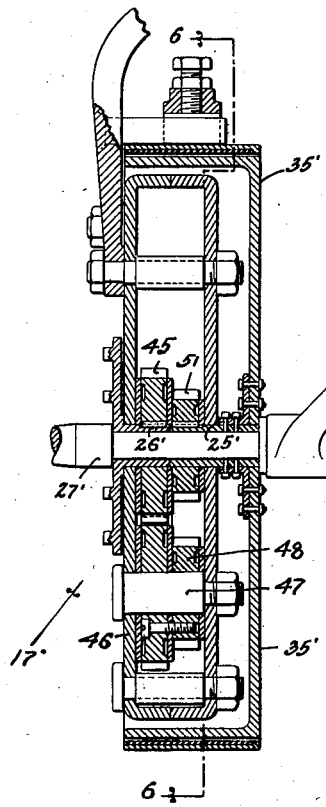
Fig. 5 is a sectional elevation corresponding to Fig. 2 but showing a modified form of the invention.
Figure 6:
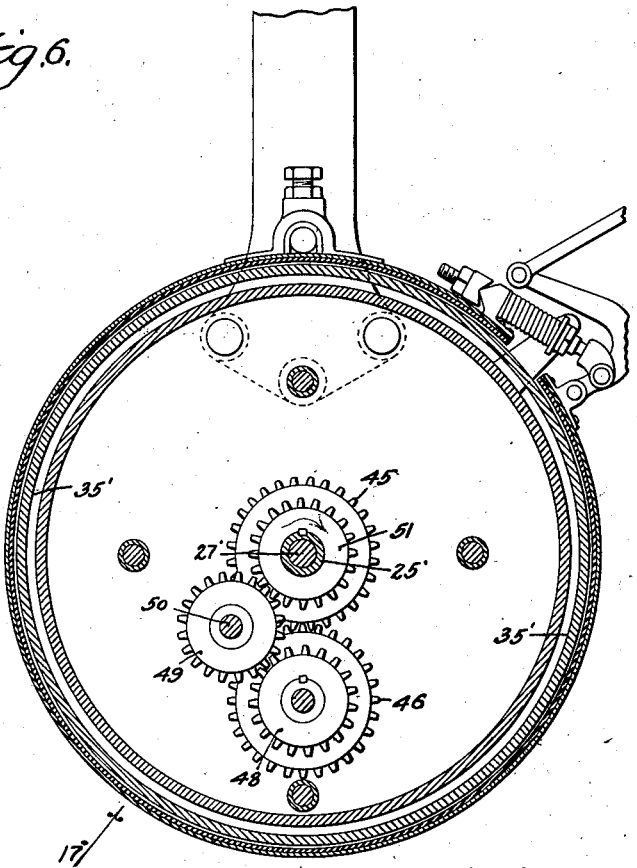
Fig. 6 is a sectional elevation taken in a plane represented by the line 6—6 in Fig. 5.

Figs. 5 and 6 show a modified form of the invention embodying a brake 17' in which intermeshing gears are used to obtain the reverse rotation of the brake drum 35'. In this construction the forward rotating sleeve 26' rotatable on shaft 27' is internally provided with a gear 45. The gear 45 engages a secondary gear 46 rotatably mounted on a shaft 47, which supports a second pinion 48, the pinion 48 being rigid and concentric with the gear 47. An intermediate gear 49 is illustrated as being mounted on a shaft 50, and is interposed between the pinion 48 and a rearward rotating gear 51 which is keyed or otherwise rigidly mounted upon the rearward rotating sleeve 25' which supports the drum 35'.

Although the gears shown in Figs. 5 and 6 are illustrated as being adapted to drive the drum in the same speed ratio with the wheel, it will be understood that these gears may be arranged to obtain a speed ratio similar to that which would be obtained with the organization shown in Figs. 2 to 4 inclusive.

It will also be understood that while I have herein illustrated two embodiments in which this invention may be constructed, that the invention is not limited to the specific constructions set forth but includes within its scope such changes as may fairly come within the spirit of the appended claims.

I claim as my invention:

1. For use in combination with an airplane, a braking device embodying a ground wheel, a strut member extending downwardly from the body of said plane and brake means interposed between said wheel and said strut adapted to transmit a torque to said strut opposed to the direction of rotation of said wheel, said means including a train of gears.

2. For use in combination with an airplane, a braking device embodying: a ground wheel; a strut member extending downwardly from the body of said plane; a drum engaging member mounted on said strut member; and brake drum adapted to engage said engaging member; and means operable by said wheel for imparting rotation to said drum opposite to the rotation of said wheel.

3. For use in combination with an airplane, a braking device embodying: a ground wheel; a strut member extending downwardly from the body of said plane; a drum engaging member mounted on said strut member; a brake drum adapted to engage said engaging member, said brake drum being provided with a sleeve coaxial with and rotatable relative to the axle of said wheel; and means interposed between said sleeve and said wheel for imparting rotation to said sleeve opposite to the rotation of said drum.

4. For use in combination with an airplane, a braking device embodying: a ground wheel; a strut member extending downwardly from the body of said plane; a drum engaging member mounted on said strut member; a brake drum adapted to engage said engaging member, said brake drum being provided with a sleeve coaxial with and rotatable relative to the axle of said wheel; and gear means interposed between said sleeve and said wheel for imparting rotation to said drum opposite to the rotation of said wheel.

5. For use in combination with an airplane, a braking device embodying: a ground wheel; a strut member extending downwardly from the body of said plane; a drum engaging member mounted on said strut member; a brake drum adapted to engage said engaging member, said brake drum being provided with a sleeve coaxial with and rotatable relative to the axle of said wheel; and means including intermeshing gears and a sprocket chain interposed between said sleeve and said wheel for imparting rotation to said drum opposite to the rotation of said wheel.

6. For use in combination with an airplane having a ground wheel and a supporting strut, a braking device embodying: a forward rotating sleeve rotatably mounted on the axle of said ground wheel; means for imparting forward rotation to said sleeve from said ground wheel; a separately supported driving member adapted to receive rotation from said sleeve; a rearward rotating sleeve rotatably mounted upon said axle; means for imparting reverse rotation to said last mentioned sleeve from said separately supported driving member; a brake drum adapted to receive rotation from said last mentioned sleeve; and a drum engaging member mounted on said strut and adapted to engage said drum.

7. For use in combination with an airplane having a ground wheel and a supporting strut, a braking device embodying: a housing mounted on said strut and adapted to receive the axle of said ground wheel; a forward rotating sleeve member provided with a peripheral gear rotatably mounted on said axle and adapted to receive rotation from said wheel; a bearing shaft mounted in said housing; a secondary gear member mounted on said bearing shaft and adapted to receive rotation from said peripheral gear; a rearward rotating sleeve on said axle; rotating means interposed between said secondary gear and said rearward rotating sleeve; a brake drum mounted on said rearward rotating sleeve; and a drum engaging member mounted on said strut adapted to engage said brake drum.

8. For use in combination with an airplane having a ground wheel and a supporting strut, a braking device embodying: a housing mounted on said strut and adapted to receive the axle of said ground wheel; a forward rotating sleeve member provided with a peripheral gear rotatably mounted on said axle and adapted to receive rotation from said wheel; a bearing shaft mounted in said housing; a secondary gear member including a sprocket wheel mounted on said bearing shaft and adapted to receive rotation from said peripheral gear; a rearward rotating sleeve having a sprocket wheel mounted thereon, rotatably mounted on said axle; chain means connecting said sprocket wheels for imparting rotation to said last mentioned sleeve; a brake drum mounted on said rearward rotating sleeve; and a drum engaging member mounted on said strut adapted to engage said brake drum.

9. For use in combination with an airplane having a ground wheel and a supporting strut, a braking device embodying: a housing mounted on said strut and adapted to receive the axle of said ground wheel; a forward rotating sleeve member provided with a peripheral gear rotatably mounted on said axle and adapted to receive rotation from said wheel; a bearing shaft mounted in said housing; a secondary gear member mounted on said bearing shaft and adapted to receive rotation from said peripheral gear; a rearward rotating sleeve on said axle; rotating means interposed between said secondary gear and said rearward rotating sleeve; a brake drum mounted on said rearward rotating sleeve; and a drum engaging member mounted on said strut adapted to engage said brake drum, said interposed rotating means having a power multiplying ratio between said wheel and said drum.

10. For use in combination with an airplane having a ground wheel and a supporting strut, a braking device embodying: a housing mounted on said strut and adapted to receive the axle of said ground wheel; a forward rotating sleeve member provided with a peripheral gear rotatably mounted on said axle and adapted to receive rotation from said wheel; a bearing shaft mounted in said housing; a secondary gear member including a sprocket wheel mounted on said bearing shaft and adapted to receive rotation from said peripheral gear; a rearward rotating sleeve having a sprocket wheel mounted thereon, rotatably mounted on said axle; chain means connecting said sprocket wheels for imparting rotation to said last mentioned sleeve; a brake drum mounted on said rearward rotating sleeve; and a drum engaging member mounted on said strut adapted to engage said brake drum, said chain and gear organization being adapted to have a power multiplying ratio between said wheel and said drum.

11. A braking device embodying: a ground wheel; a brake drum; and means interposed between said wheel and said drum for imparting rotation to said drum opposite to the rotation of said wheel.

12. A braking device embodying: a ground wheel; a brake drum; and means interposed between said wheel and said drum for imparting rotation to said drum opposite to the rotation of said wheel, said interposed means having a power multiplying ratio between said wheel and said drum.

13. A braking device embodying: a ground wheel; a brake drum; means interposed between said wheel and said drum for imparting rotation to said drum opposite to the rotation of said wheel, and a drum engaging member adapted to engage said drum.

14. An airplane brake organization embodying: a ground wheel; a brake drum; means interposed between said wheel and said drum for imparting rotation to said drum opposite to the rotation of said wheel; a drum engaging member adapted to engage said drum; and means for transmitting torque from said drum engaging member to an airplane strut.

15. For use in combination with an airplane having a ground wheel and a supporting strut, a braking device embodying: a housing mounted on said strut and adapted to receive the axle of said ground wheel; a forward rotating sleeve member provided with a peripheral gear rotatably mounted on said axle and adapted to receive rotation from said wheel; a bearing shaft mounted in said housing; a secondary gear member mounted on said bearing shaft and adapted to receive rotation from said peripheral gear; a rearward rotating sleeve on said axle; rotating means interposed between said secondary gear and said rearward rotating sleeve; a brake drum mounted on said rearward rotating sleeve; and a drum engaging member mounted on said strut adapted to engage said brake drum, said housing forming part of said supporting strut.

16. A braking device embodying a ground wheel; a brake drum; and means interposed between said wheel and said drum for imparting a speed of rotation to said drum less than the speed of rotation of said wheel.

17. A braking device embodying a ground wheel; a brake drum; and means interposed between said wheel and said drum for imparting rotation to said drum, said interposed means having a speed reducing ratio between said wheel and said drum.

In testimony whereof, I have hereunto set my hand at Los Angeles, California, this 26th day of June, 1928.

HARVEY HIERS.